US012683678B2

(12) United States Patent
Arai et al.

(10) Patent No.: US 12,683,678 B2
(45) Date of Patent: Jul. 14, 2026

(54) WIRELESS COMMUNICATION APPARATUS, WIRELESS COMMUNICATION SYSTEM AND WIRELESS COMMUNICATION METHOD

(71) Applicant: NTT, INC., Tokyo (JP)

(72) Inventors: Takuto Arai, Musashino (JP); Hideki Toshinaga, Musashino (JP); Naoki Kita, Musashino (JP); Yushi Shirato, Musashino (JP); Daisei Uchida, Musashino (JP); Mizuki Suga, Musashino (JP); Kota Ito, Musashino (JP)

(73) Assignee: NTT, Inc., Tokyo (JP)

( * ) Notice: Subject to any disclaimer, the term of this patent is extended or adjusted under 35 U.S.C. 154(b) by 241 days.

(21) Appl. No.: 18/291,557

(22) PCT Filed: Aug. 5, 2021

(86) PCT No.: PCT/JP2021/029136
§ 371 (c)(1),
(2) Date: Jan. 23, 2024

(87) PCT Pub. No.: WO2023/012972
PCT Pub. Date: Feb. 9, 2023

(65) Prior Publication Data
US 2024/0372611 A1 Nov. 7, 2024

(51) Int. Cl.
H04B 10/2575 (2013.01)
H04B 7/005 (2006.01)
(Continued)

(52) U.S. Cl.
CPC ........... H04B 7/2643 (2013.01); H04B 7/005 (2013.01); H04B 10/2575 (2013.01); H04W 56/0065 (2013.01)

(58) Field of Classification Search
CPC ...................................... H04B 10/2575–25759
See application file for complete search history.

(56) References Cited

U.S. PATENT DOCUMENTS

| 6,122,083 | A | 9/2000 | Ohta et al. | |
| 2003/0161637 | A1* | 8/2003 | Yamamoto | H04J 14/0206 |
| | | | | 398/115 |

(Continued)

FOREIGN PATENT DOCUMENTS

| CN | 101051851 A | 10/2007 |
| JP | H07-264650 A | 10/1995 |

(Continued)

OTHER PUBLICATIONS

Anil Umesh et al., "Overview of O-RAN Fronthaul Specifications", Ntt Docomo Technical Journal, vol. 27, No. 1, Apr. 2019.

(Continued)

*Primary Examiner* — Nathan M Cors
(74) *Attorney, Agent, or Firm* — Harness, Dickey & Pierce, P.L.C.

(57) ABSTRACT

According to one aspect of the present invention, there is provided a radio communication device that performs communication with a terminal-side communication device having an antenna using an analog signal for transmitting information by a waveform of an amplitude or a phase of light to receive a signal received by the antenna and transmit a signal radiated by the antenna, the terminal-side communication device and the radio communication device being included in a radio communication system that performs radio communication with a communication target terminal via the antenna using time division duplex (TDD), the radio communication device including: an uplink delay adjustment unit configured to adjust a delay caused by propagation of an uplink signal that is a signal flowing from the terminal to the radio communication device via the antenna; and a (Continued)

downlink delay adjustment unit configured to adjust a delay caused by propagation of a downlink signal that is a signal flowing from the radio communication device to the terminal via the antenna.

7 Claims, 12 Drawing Sheets

(51) Int. Cl.
    *H04B 7/26*        (2006.01)
    *H04W 56/00*     (2009.01)

(56) References Cited

U.S. PATENT DOCUMENTS

| | | | |
|---|---|---|---|
| 2004/0151503 A1 | 8/2004 | Kashima et al. | |
| 2008/0056167 A1* | 3/2008 | Kim | H04B 10/25759 |
| | | | 370/294 |
| 2014/0112667 A1* | 4/2014 | Neukirch | H01Q 1/2291 |
| | | | 398/115 |
| 2017/0180070 A1* | 6/2017 | Ruffini | H04B 7/2125 |
| 2017/0230148 A1* | 8/2017 | Xu | H04L 1/1887 |
| 2017/0280293 A1* | 9/2017 | Shekalim | H04W 4/023 |

FOREIGN PATENT DOCUMENTS

| | | | | |
|---|---|---|---|---|
| JP | 2004-229180 A | 8/2004 | | |
| JP | 2014-096637 A | 5/2014 | | |
| WO | WO-2012/148938 A1 | 11/2012 | | |
| WO | 2017002269 A1 | 1/2017 | | |
| WO | WO2017002269 | * | 5/2017 | H04W 56/00 |

OTHER PUBLICATIONS

Kota Ito et al., "Efficiently Accommodating High-frequency-band Wireless Systems by Using Analog Radio-over-fiber", NTT Technical Review, vol. 32, No. 3 (2020).
O-RAN Fronthaul Working Group, Control, User and Synchronization Plane Specification Version 3.00, 2020.

* cited by examiner

WIRELESS COMMUNICATION APPARATUS, WIRELESS COMMUNICATION SYSTEM AND WIRELESS COMMUNICATION METHOD

CROSS-REFERENCE TO RELATED APPLICATIONS

This application is a 371 U.S. National Phase of International Application No. PCT/JP2021/029136, filed on Aug. 5, 2021. The entire disclosure of the above application is incorporated herein by reference.

TECHNICAL FIELD

The present invention relates to a wireless communication apparatus, a wireless communication system and a wireless communication method.

BACKGROUND ART

There is a growing demand for communication systems characterized by high speed, large capacity, low latency, and multiple terminal connections, such as the 5th generation mobile communication system (5G). In order to realize such communication, discussions have also been made on functional split that divides functional units of a base station device, and in 5G, the base station device is installed by dividing it into logical nodes called a centralized unit (CU), a distributed unit (DU), and a radio unit (RU) (see NPL 1). In addition, for the purpose of suppressing the transmission capacity of a front haul (FH) section between the DU and the RU and simplifying a radio communication device corresponding to the RU (hereinafter referred to as an "extension station"), an analog radio-over-fiber (RoF) has been proposed, in which analog optical modulation signals are used for communication between radio communication devices corresponding to the CU and the DU (hereinafter referred to as "aggregation stations") and the extension station (see NPL 2). Furthermore, in order to realize high-speed and large-capacity communication, it is assumed that high frequency bands such as millimeter waves will be used, and the use of a time division duplex (TDD) technique is being studied in order to suppress an increase in the frequency band used in uplink and downlink communication between extension stations and terminals such as smartphones.

CITATION LIST

Non Patent Literature

[NPL 1] Umesh et al., Overview of O-RAN Fronthaul Specifications, NTT DOCOMO Technical Journal Vol. 27 No. 1 (April 2019)
[NPL 2] Ito et al., Efficient accommodation of various high-frequency band wireless systems using analog ROF, NTT Technical Journal Vol. 32 No. 3 (2020)
[NPL 3] O-RAN Fronthaul Control, User and Synchronization Plane Specification Version 3.0"

SUMMARY OF INVENTION

Technical Problem

In general, in radio communication using a TDD technique, it is necessary to synchronize switching of wireless transmission/reception timings by one or more extension stations in order to avoid interference. That is, it is necessary for the timing at which the signal propagated from the aggregation station to the extension station is radiated from the extension station to be substantially the same at one or more extension stations. Further, it is necessary for the timing at which one or more extension stations receive signals from the terminal to be substantially the same. The accuracy of time synchronization is, for example, ±1.5 microseconds.

However, the time required for signal propagation between the aggregation station and the extension station depends on the distance between the aggregation station and the extension station. Therefore, in order to synchronize the transmission and reception timings of a plurality of extension stations, it is necessary to absorb the difference in signal propagation time caused by the difference in distance between the aggregation station and the extension station. Therefore, when signals are exchanged between the aggregation station and the extension station in the form of digital signals, a buffering function for storing the signals is used to synchronize the timing of switching between transmission and reception (see NPL 3).

On the other hand, in the case of an analog RoF, it is difficult to buffer signals because the signals are exchanged between the aggregation station and the extension station using analog signals. Therefore, in the analog RoF, it is conceivable to establish synchronization by forwarding the signal from the aggregation station to the extension station. Forwarding of a signal means that transmission of a signal from the aggregation station to the extension station is started at an earlier timing as the distance between the aggregation station and the extension station is longer.

By forwarding the signal in this way, it is possible to synchronize the timing of the transmission of the signal (that is, the downlink signal) from the extension station to the terminal. However, as for the reception of the signal received by the extension station from the terminal by the aggregation station (that is, the uplink signal), since the timing at which the aggregation station can receive the signal becomes later as the distance between the aggregation station and the extension station is longer, it is necessary for the aggregation station to be able to receive signals until a late timing.

Thus, the longer the distance between the aggregation station and the extension station, the earlier the timing at which the aggregation station outputs the downlink signal, but the later the timing at which the aggregation station receives the uplink signal. Here, in the case of the analog RoF, since conversion devices for electrical signals and optical signals are different for downlinks and uplinks, it is necessary to switch paths between downlinks and uplinks using a TDD switch or the like. Therefore, in the aggregation station, the timings of the downlink signal and the uplink signal may collide with each other. In order to avoid such collisions, there may be a method of determining a timing called a guard time, that is, a timing at which communication is not performed. However, when a guard time is determined, communication is not performed during the guard time period, and therefore the communication efficiency is lowered.

In this way, when TDD is performed in communication in which communication between radio communication devices is performed using analog signals, there have been cases where the quality of communication has deteriorated, such as a collision of timing between an uplink signal and a downlink signal, and reduced communication efficiency.

In view of the above circumstances, an object of the present invention is to provide a technique for suppressing deterioration in communication quality in radio communication using an analog signal for communication between radio communication devices.

Solution to Problem

According to one aspect of the present invention, there is provided a radio communication device that performs communication with a terminal-side communication device having an antenna using an analog signal for transmitting information by a waveform of an amplitude or a phase of light to receive a signal received by the antenna and transmit a signal radiated by the antenna, the terminal-side communication device and the radio communication device being included in a radio communication system that performs radio communication with a communication target terminal via the antenna using time division duplex (TDD), the radio communication device including: an uplink delay adjustment unit configured to adjust a delay caused by propagation of an uplink signal that is a signal flowing from the terminal to the radio communication device via the antenna; and a downlink delay adjustment unit configured to adjust a delay caused by propagation of a downlink signal that is a signal flowing from the radio communication device to the terminal via the antenna.

According to one aspect of the present invention, there is provided a radio communication system that performs communication with a communication target terminal using time division duplex (TDD), the radio communication system including: a terminal-side communication device having an antenna; and a radio communication device that performs communication with the terminal-side communication device using an analog signal for transmitting information by a waveform of an amplitude or a phase of light to receive a signal received by the antenna and transmit a signal radiated by the antenna, in which the radio communication device includes an uplink delay adjustment unit configured to adjust a delay caused by propagation of an uplink signal that is a signal flowing from the terminal to the radio communication device via the antenna, and a downlink delay adjustment unit configured to adjust a delay caused by propagation of a downlink signal that is a signal flowing from the radio communication device to the terminal via the antenna.

According to one aspect of the present invention, there is provided a radio communication method provided by a radio communication system including a terminal-side communication device having an antenna and a radio communication device that performs communication with the terminal-side communication device using an analog signal for transmitting information by a waveform of an amplitude or a phase of light to receive a signal received by the antenna and transmit a signal radiated by the antenna, the radio communication device including an uplink delay adjustment unit configured to adjust a delay caused by propagation of an uplink signal that is a signal flowing from the terminal to the radio communication device via the antenna and a downlink delay adjustment unit configured to adjust a delay caused by propagation of a downlink signal that is a signal flowing from the radio communication device to the terminal via the antenna, the radio communication method including: a first switching step of switching an operation of the antenna from a reception operation of receiving a signal transmitted by the terminal to a radiation operation of radiating a signal; and a second switching step of switching the operation of the antenna from the radiation operation to the reception operation.

Advantageous Effects of Invention

According to the present invention, it is possible to suppress deterioration in communication quality in radio communication using an analog signal for communication between radio communication devices.

DESCRIPTION OF EMBODIMENTS

Embodiment

Figure 1:
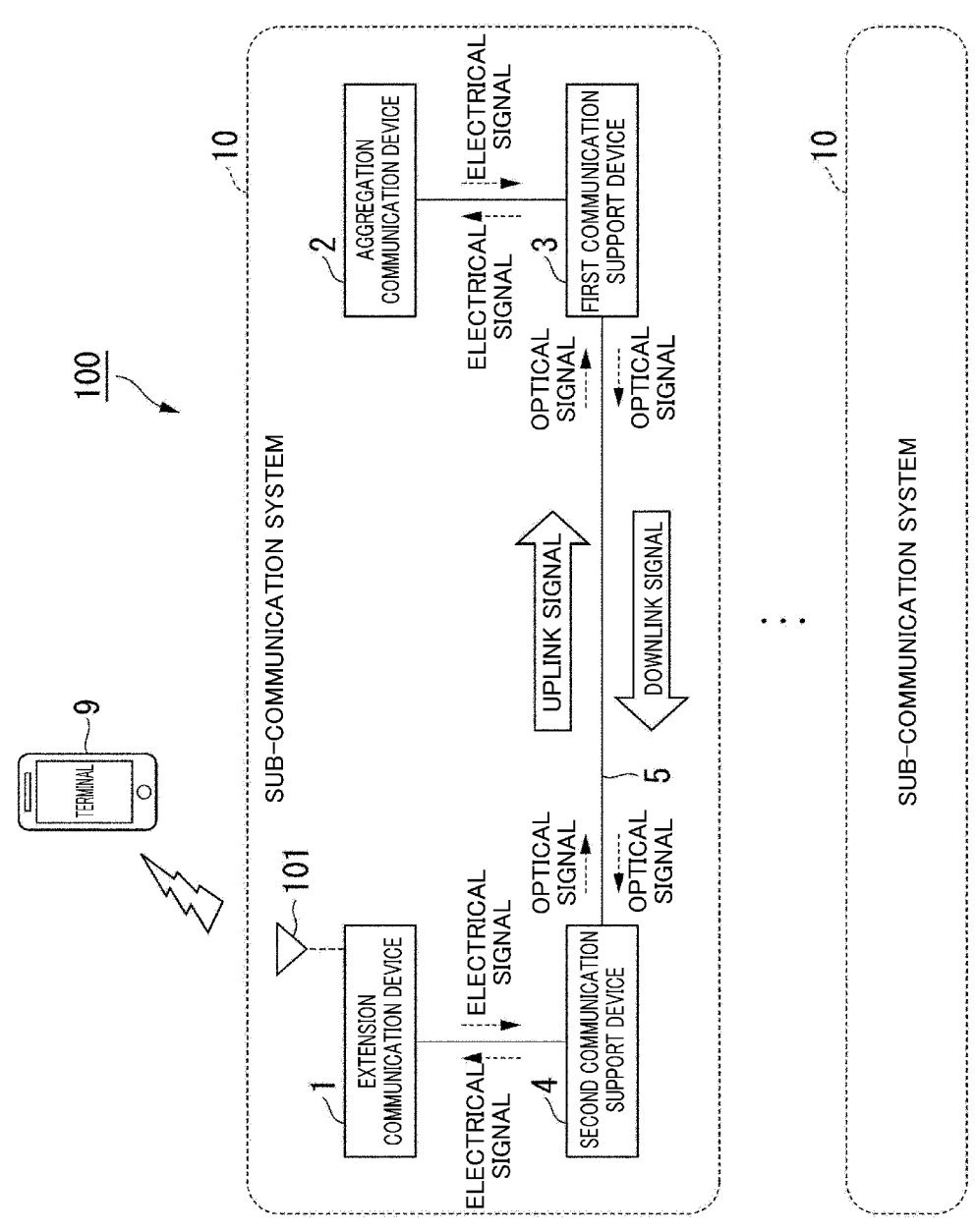
FIG. 1 is a diagram illustrating an example of a configuration of a radio communication system according to an embodiment.

FIG. 1 is a diagram illustrating an example of a configuration of a radio communication system 100 according to an embodiment. The radio communication system 100 performs communication with a terminal 9 capable of radio communication, such as a smartphone, using time division duplex (TDD). That is, the terminal 9 is a communication target of the radio communication system 100. The radio communication system 100 includes one or more sub-communication systems 10. The sub-communication system 10 includes an extension communication device 1, an aggregation communication device 2, a first communication support device 3, a second communication support device 4, and an analog transmission line 5. The extension communication device 1 includes an antenna 101. The aggregation communication device 2 is, for example, an aggregation station. The extension communication device 1 transmits and receives signals to and from the terminal 9 by radio via the antenna 101. One or more extension communication devices 1 are connected to the aggregation communication device 2. The extension communication device 1 is, for example, an extension station.

For the sake of simplicity of description, the radio communication system 100 will be described with reference to the case where different sub-communication systems 10 are independent of each other, but the different sub-communication systems 10 need not necessarily be independent of each other. Note that being independent of each other means that a signal flowing through one sub-communication system 10 of any two sub-communication systems 10 does not flow into the other sub-communication system 10. In addition, being independent of each other means that a device provided in one sub-communication system 10 of any two sub-communication systems 10 does not control the operation of a device provided in the other sub-communication system 10. Note that the devices belonging to the sub-communication system 10 are specifically the extension communication device 1, the aggregation communication device 2, the first communication support device 3, and the second communication support device 4.

The aggregation communication device 2 exchanges signals with the terminal 9 via the extension communication device 1. Specifically, the aggregation communication device 2 executes uplink signal processing and downlink signal processing. The uplink signal processing is a process of receiving a signal flowing from the terminal 9 to the aggregation communication device 2 (hereinafter referred to as an "uplink signal") and performing signal processing on the received uplink signal.

The downlink signal processing is a process related to the transmission of a signal flowing from the aggregation communication device 2 to the terminal 9 (hereinafter referred to as a "downlink signal"). The downlink signal processing includes, for example, downlink electrical signal generation processing. The downlink electrical signal generation processing is a process of generating an analog signal, which is an analog signal for transmitting information by a waveform of a voltage or a current, and arrives at the first communication support device 3 (hereinafter referred to as a "downlink electrical signal"). The downlink electrical signal is transmitted from the extension communication device 1 to the terminal 9 through conversion into an optical signal and re-conversion into an electrical signal. Therefore, a downlink electrical signal is a downlink signal in which information is represented by an electrical signal. Specifically, the downlink electrical signal generation processing is a process of generating a downlink electrical signal by controlling the operation of a power supply and a modulator.

The downlink signal processing includes, for example, scheduling processing. The scheduling processing is a process of controlling allocation of communication resources to the terminal 9 and a timing of generation of a downlink electrical signal.

The first communication support device 3 executes electro-optical conversion processing and photoelectric conversion processing. The electro-optical conversion processing is a process of converting an input electrical signal into an optical signal by intensity modulation or the like. The electro-optical conversion processing is, for example, a process of converting an electrical signal into an optical signal using an electro-optical element. The photoelectric conversion processing is a process of converting an input optical signal into an electrical signal and detecting an optical signal subjected to intensity modulation or the like. The photoelectric conversion processing is, for example, a process of converting an optical signal into an electrical signal using a photoelectric element.

The first communication support device 3 converts the downlink electrical signal generated by the aggregation communication device 2 into a downlink optical signal by execution of the electro-optical conversion processing. The downlink optical signal is an analog signal for transmitting information by a waveform of an amplitude or a phase of light, and is an analog signal output from the first communication support device 3. The downlink optical signal is transmitted from the extension communication device 1 to the terminal 9 through re-conversion into an electrical signal in the second communication support device 4. Therefore, a downlink optical signal is a downlink signal in which information is represented by an optical signal.

The first communication support device 3 outputs the generated downlink optical signal to an analog transmission line 5. Further, the first communication support device 3 receives an optical signal propagated through the analog transmission line 5 (hereinafter referred to as an "uplink optical signal").

The uplink optical signal is an analog signal for transmitting information by a waveform of an amplitude or a phase of light, and is an analog signal arriving at the first communication support device 3. The uplink optical signal is a signal in which a signal propagated from the terminal 9 to the extension communication device 1 is converted into an optical signal in the second communication support device 4 and arrives at the first communication support device 3. Therefore, an uplink optical signal is an uplink signal in which information is represented by an optical signal.

The first communication support device 3 converts an input uplink optical signal into an uplink electrical signal by execution of photoelectric conversion processing. The uplink electrical signal is an analog signal for transmitting information by a waveform of a voltage or a current, and is an analog signal output from the first communication support device 3. The uplink electrical signal is a signal obtained by converting an uplink optical signal. Therefore, an uplink electrical signal is an uplink signal in which information is represented by an electrical signal.

The first communication support device 3 includes an uplink path and a downlink path. An uplink path is a path through which an uplink signal propagates. A downlink path is a path through which a downlink signal propagates. The uplink path and the downlink path are spatially different paths. That is, the uplink path and the downlink path are, for example, different waveguides. The uplink path and the downlink path provided in the first communication support device 3 are paths through which optical signals or electrical signals flow.

The first communication support device 3 may be provided with wavelength division multiplexing (WDM) and transmit and receive signals to and from the second communication support device 4 via the analog transmission line 5 via the WDM. Specifically, the first communication support device 3 may receive the uplink optical signal by WDM and then convert each optical signal separated for each optical wavelength into an uplink electrical signal by photoelectric conversion processing. Further, the first communication support device 3 may convert each of one or more downlink electrical signals into a downlink optical signal by electro-optical conversion processing, then multiplex the converted signals by WDM, and output the multiplexed signals to the analog transmission line 5 in the state of one downlink optical signal.

Figure 2:
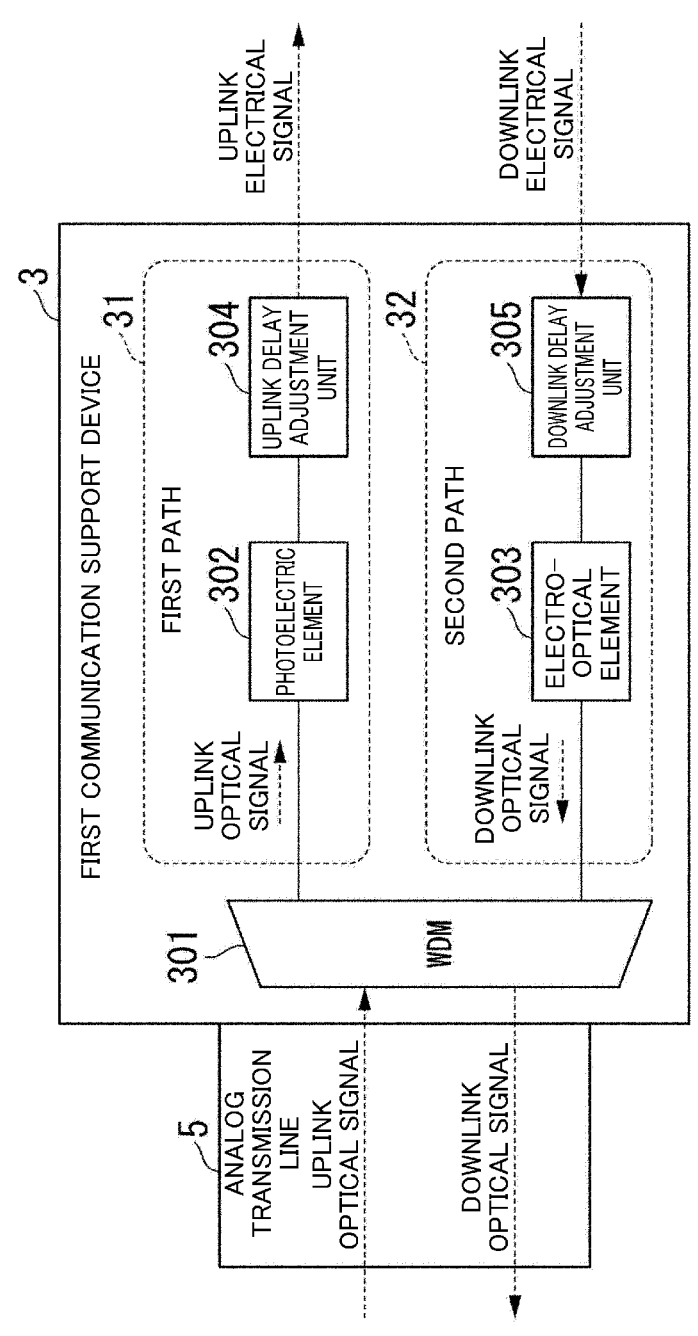
FIG. 2 is an explanatory diagram for describing an example of configurations of an uplink channel and a downlink channel provided in a first communication support device according to the embodiment.

FIG. 2 is an explanatory diagram for describing an example of the configuration of the first communication support device 3 according to the embodiment. In the example illustrated in FIG. 2, the first communication support device 3 includes a WDM 301, a photoelectric element 302, an electro-optical element 303, an uplink delay adjustment unit 304, and a downlink delay adjustment unit 305. The WDM 301 is WDM. The photoelectric element 302 is a photoelectric element. The electro-optical element 303 is an electro-optical element.

The uplink delay adjustment unit 304 adjusts the delay caused by the propagation of the uplink signal. More specifically, the uplink delay adjustment unit 304 generates a delay for reducing a difference between the sub-communication systems 10 with respect to a time when an uplink signal propagates from the antenna 101 to the aggregation communication device 2 in order to satisfy a predetermined uplink and downlink switching timing of TDD. The uplink delay adjustment unit 304 is, for example, a delay element.

Incidentally, the signal whose delay is to be adjusted by the uplink delay adjustment unit 304 may be a digital signal. In such a case, a digital signal is input to the uplink delay adjustment unit 304. When a digital signal is input to the uplink delay adjustment unit 304, an analog-to-digital converter is located in the preceding stage of the uplink delay adjustment unit 304. A specific example of the configuration in which the digital signal is input to the uplink delay adjustment unit 304 will be described in detail in a modification example.

When the input signal is a digital signal, the uplink delay adjustment unit 304 adjusts the delay by, for example, buffering. The length of the delay to be generated is, for example, a length obtained on the basis of a result of measuring the delay in advance by an operator of the radio communication system 100. The delay time to be adjusted may be a result obtained on the basis of, for example, periodically measured delay times. The uplink delay adjustment unit 304 may be, for example, a path itself through which a signal propagates and which has a length sufficient to generate a delay obtained on the basis of a delay time measured in advance. The path may be, for example, a copper cable when the flowing signal is an electrical signal.

Specifically, the delay generated by the uplink delay adjustment unit 304 will be described. More specifically, the delay generated by the uplink delay adjustment unit 304 will be described with reference to the sub-communication system 10 as a reference, taking a case where a delay of 5 seconds occurs in the sub-communication system 10 to be compared as an example. In this case, the delay time generated by the uplink delay adjustment unit 304 in the sub-communication system 10 as a reference is, for example, 6 seconds, and the delay time generated by the uplink delay adjustment unit 304 in the sub-communication system 10 to be compared is, for example, 1 second. In this way, the time difference (that is, delay) between the sub-communication system 10 as a reference and the sub-communication system 10 to be compared is eliminated.

The time difference of 5 seconds in the above example is, for example, the time measured by the operator. The operator controls the delay time generated by the uplink delay adjustment unit 304 of each sub-communication system 10 on the basis of the measured time, for example, via an input unit 22 or a communication unit 23 included in the aggregation communication device 2. The input unit 22 and the communication unit 23 included in the aggregation communication device 2 will be described later. The time difference of 5 seconds in the above example is, for example, an example of the periodically measured delay times.

The difference between the sub-communication systems 10 in the time when the uplink signal propagates from the antenna 101 to the aggregation communication device 2 is mainly caused by the difference in the length of the analog transmission line 5. Therefore, the uplink delay adjustment unit 304 reduces a difference between the sub-communication systems 10 with respect to the time when the uplink signal propagates through the analog transmission line 5.

The downlink delay adjustment unit 305 adjusts the delay caused by the propagation of the downlink signal. More specifically, the downlink delay adjustment unit 305 generates a delay for reducing a difference between the sub-communication systems 10 for a time when a downlink signal propagates from the aggregation communication device 2 to the antenna 101 in order to satisfy a predetermined uplink and downlink switching timing of TDD. The downlink delay adjustment unit 305 is, for example, a delay element.

Incidentally, the signal whose delay is to be adjusted by the downlink delay adjustment unit 305 may be a digital signal. In such a case, a digital signal is input to the downlink delay adjustment unit 305. When a digital signal is input to the downlink delay adjustment unit 305, an analog-to-digital converter is located in the preceding stage of the downlink delay adjustment unit 305. A specific example of the configuration in which the digital signal is input to the downlink delay adjustment unit 305 will be described in detail in a modification example.

When the input signal is a digital signal, the downlink delay adjustment unit 305 adjusts the delay by, for example, buffering. The length of the delay to be generated is, for example, a length obtained on the basis of a result of measuring the delay in advance by an operator of the radio communication system 100. The delay time to be adjusted may be a result obtained on the basis of, for example, periodically measured delay times. The downlink delay adjustment unit 305 may be, for example, a path itself through which a signal propagates and which has a length sufficient to generate a delay obtained on the basis of a delay time measured in advance. The path may be, for example, an optical fiber when the flowing signal is an optical signal. The path may be, for example, a copper cable when the flowing signal is an electrical signal.

Specifically, the delay generated by the downlink delay adjustment unit 305 will be described. More specifically, the delay generated by the downlink delay adjustment unit 305 will be described with reference to the sub-communication system 10 as a reference, taking a case where a delay of 5 seconds occurs in the sub-communication system 10 to be compared as an example. In this case, the delay time generated by the downlink delay adjustment unit 305 in the sub-communication system 10 as a reference is, for example, 6 seconds, and the delay time generated by the downlink delay adjustment unit 305 in the sub-communication system 10 to be compared is, for example, 1 second. In this way, the time difference (that is, delay) between the sub-communication system 10 as a reference and the sub-communication system 10 to be compared is eliminated.

The time difference of 5 seconds in the above example is, for example, the time measured by the operator. The operator controls the delay time generated by the downlink delay adjustment unit 305 of each sub-communication system 10 on the basis of the measured time, for example, via the input unit 22 or the communication unit 23 included in the aggregation communication device 2. The time difference of 5 seconds in the above example is, for example, an example of the periodically measured delay times.

The difference between the sub-communication systems 10 in the time when the downlink signal propagates from the aggregation communication device 2 to the antenna 101 is mainly caused by the difference in the length of the analog transmission line 5. Therefore, the downlink delay adjustment unit 305 reduces a difference between the sub-communication systems 10 with respect to the time when the downlink signal propagates through the analog transmission line 5.

In the example illustrated in FIG. 2, the uplink channel has the WDM 301 on the input side and a first path 31 of the uplink delay adjustment unit 304 on the output side. In the example illustrated in FIG. 2, the downlink channel has the downlink delay adjustment unit 305 on the input side and a second path 32 of the WDM 301 on the output side.

The description will now return to FIG. 1. The second communication support device 4 also includes an uplink path and a downlink path. The uplink path and the downlink path provided in the second communication support device 4 are paths through which optical signals or electrical signals flow, similarly to the uplink path and the downlink path provided in the first communication support device 3. The second communication support device 4 executes electro-optical conversion processing and photoelectric conversion processing. The second communication support device 4 further executes switching processing. The switching processing is a process of switching the operation of the antenna 101. Switching the operation of the antenna 101 means switching between the reception operation and the radiation operation of the antenna 101. The reception operation is an operation in which the antenna 101 receives a signal transmitted by the terminal 9. The radiation operation is an operation in which the antenna 101 radiates a signal. The terminal 9 receives the signal radiated by the antenna 101.

More specifically, the switching processing is a process of switching a process of passing through a path of a signal from the antenna 101 to the aggregation communication device 2 and a process of passing through a path of a signal from the aggregation communication device 2 to the antenna 101 at a predetermined cycle according to the TDD timing. Specifically, the switching processing is performed by a switch.

For example, switching between on and off of the switch switches between a state in which a path of a signal from the antenna 101 to the aggregation communication device 2 passes through and a state in which a path of a signal from the aggregation communication device 2 to the antenna 101 passes through. If a path of a signal from the antenna 101 to the aggregation communication device 2 passes through, the signal reaching the antenna 101 from the terminal 9 reaches the aggregation communication device 2. That is, the antenna 101 is in a state of performing a reception operation.

On the other hand, if a path of a signal from the aggregation communication device 2 to the antenna 101 passes through, the signal output by the aggregation communication device 2 reaches the antenna 101 and is radiated. That is, the antenna 101 is in a state of performing a radiation operation. Therefore, the switching processing is also a process of switching between a state in which a signal flows through the uplink channel and a state in which a signal flows through the downlink channel. By executing the switching processing, time division duplex (TDD) is realized.

Figure 3:
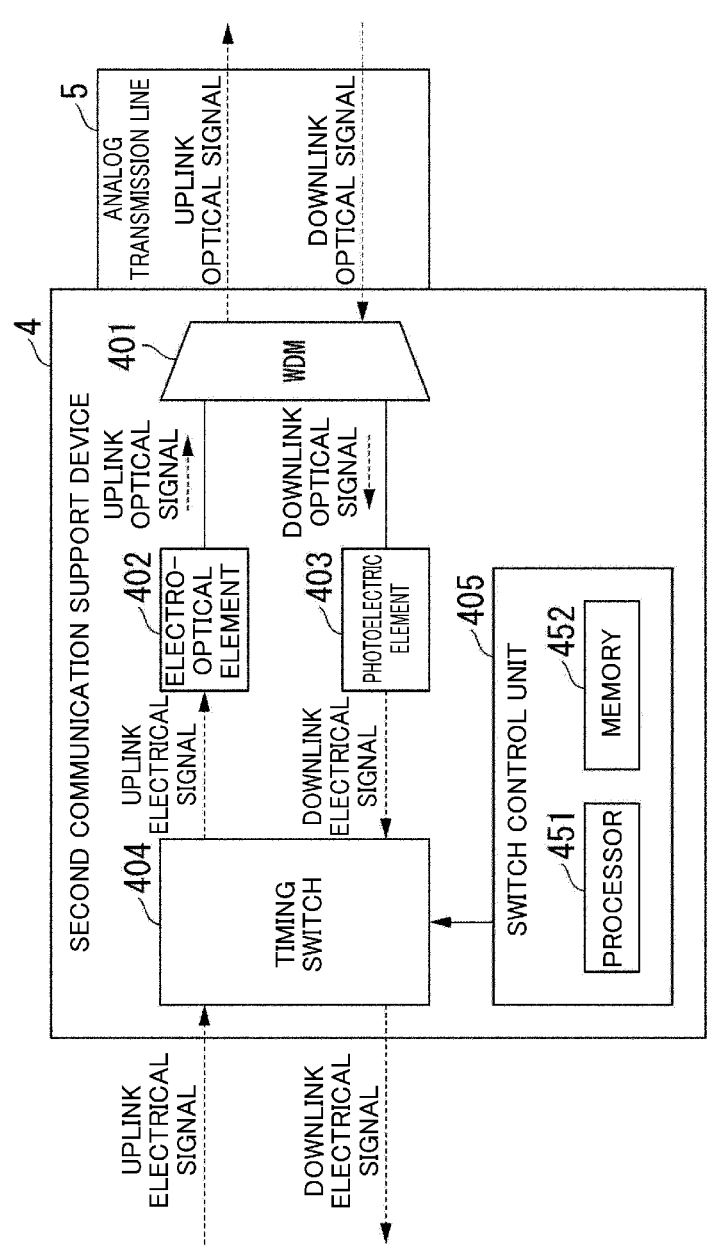
FIG. 3 is an explanatory diagram for describing an example of configurations of an uplink channel and a downlink channel provided in a second communication support device according to the embodiment.

FIG. 3 is an explanatory diagram for describing an example of the configuration of the second communication support device 4 according to the embodiment. In the example illustrated in FIG. 3, the second communication support device 4 includes a WDM 401, an electro-optical element 402, a photoelectric element 403, a timing switch 404, and a switch control unit 405. The WDM 401 is WDM. The electro-optical element 402 is an electro-optical element. The photoelectric element 403 is a photoelectric element.

The timing switch 404 is a switch that switches between a state in which a signal flows in an uplink path and a state in which a signal flows in a downlink path. Therefore, switching between on and off of the timing switch 404 in FIG. 3 is an example of switching processing. The timing switch 404 switches between a state in which a signal flows in an uplink path and a state in which a signal flows in a downlink path under control of the switch control unit 405.

The switch control unit 405 includes a processor 451 such as a central processing unit (CPU) and a memory 452 that are connected via a bus. The switch control unit 405 executes a program using the processor 451 and the memory 452. The switch control unit 405 is electrically connected to the timing switch 404, and controls the operation of the timing switch 404 by execution of a program.

The timing of execution of the switching processing is, for example, a predetermined timing. More specifically, the execution of the switching processing occurs at substantially the same timing in each sub-communication system 10 provided in the radio communication system 100. Thus, the technique of time division duplex (TDD) is realized.

The timing of execution of the switching processing may be a timing determined on the basis of communication with a predetermined device when the switch control unit 405 is configured to be able to communicate with the predetermined device. The predetermined device is, for example, a control unit 21 provided in the aggregation communication device 2, which will be described later. The timing of the generation of the downlink electrical signal by the downlink electrical signal generation processing is a timing satisfying a condition that the cycle is synchronized with the cycle in which the switching processing is executed. Therefore, the generation of the downlink electrical signal by the downlink electrical signal generation processing and the execution of the switching processing are not necessarily executed at the same time as long as the cycle of execution is synchronized.

In the example illustrated in FIG. 3, the uplink path is a path that has the timing switch 404 on the input side and reaches the WDM 401 via the electro-optical element 402. The uplink path in the example illustrated in FIG. 3 has the WDM 401 on the output side.

In the example illustrated in FIG. 3, the downlink path is a path that has the WDM 401 on the input side and reaches the timing switch 404 via the photoelectric element 403. That is, the downlink path in the example illustrated in FIG. 3 has the timing switch 404 on the output side.

The description will now return to FIG. 1. The analog transmission line 5 is a transmission line for transmitting an analog signal. More specifically, it is a transmission line for transmitting an analog signal for transmitting information by a waveform of an amplitude or a phase of light. The analog transmission line 5 is connected to the first communication support device 3 and the second communication support device 4, and transmits an analog signal from one of the first communication support device 3 and the second communication support device 4 to the other. The analog transmission line 5 may be, for example, a single mode fiber, a multi-core fiber, or a dispersion shifted fiber. That is, the analog transmission line 5 may be, for example, a fiber.

The distance of the path connecting the antenna 101 and the timing switch 404 is so short that it can be ignored as compared with the distance from the timing switch 404 to the first communication support device 3. Therefore, the delay occurring in the path from the antenna 101 to the timing switch 404 is a length that can be ignored compared with the delay occurring between the timing switch 404 and the first communication support device 3.

Figure 4:
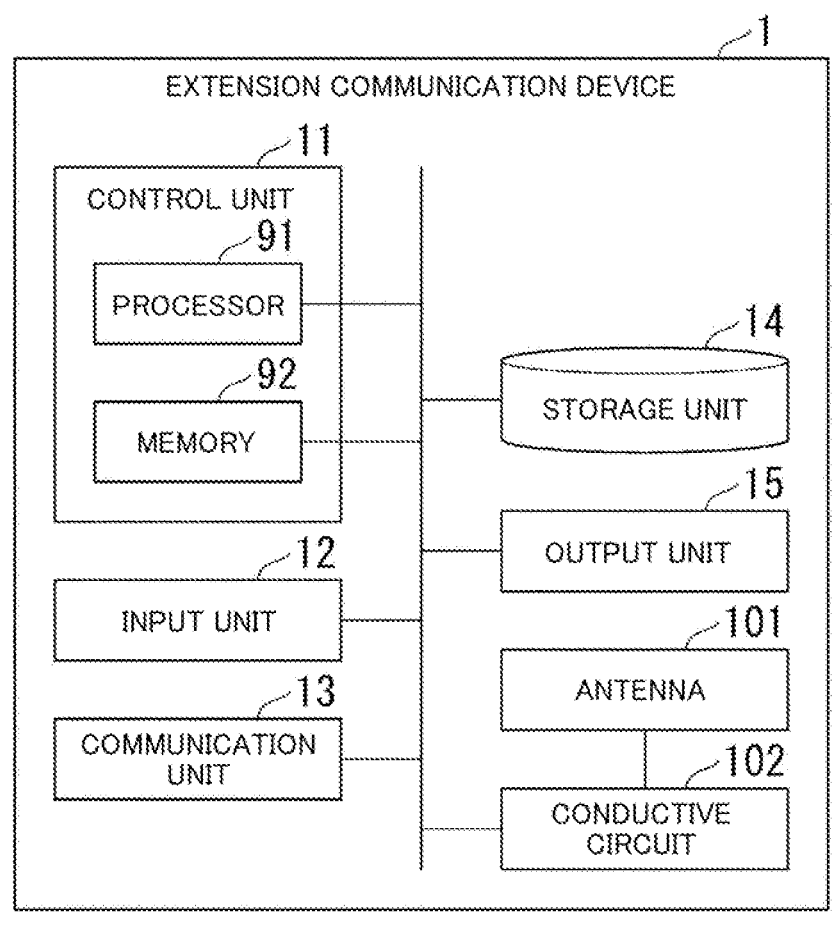
FIG. 4 is a diagram illustrating an example of a hardware configuration of an extension communication device according to the embodiment.

FIG. 4 is a diagram illustrating an example of a hardware configuration of the extension communication device 1 according to the embodiment. The extension communication device 1 includes a control unit 11 including a processor 91 such as a CPU and a memory 92 connected via a bus, and executes a program. The extension communication device 1 functions as a device including the control unit 11, an input unit 12, a communication unit 13, a storage unit 14, an output unit 15, the antenna 101, and a conductive circuit 102 by executing a program.

More specifically, the processor 91 reads the program stored in the storage unit 14, and stores the read program in the memory 92. By the processor 91 executing the program stored in the memory 92, the extension communication device 1 functions as a device including the control unit 11, the input unit 12, the communication unit 13, the storage unit 14, the output unit 15, the antenna 101, and the conductive circuit 102.

The control unit 11 controls operations of various functional units provided in the extension communication device 1. The control unit 11 controls, for example, the operation of the output unit 15. The control unit 11 records various types of information in the storage unit 14, for example.

The input unit 12 includes input devices such as a mouse, a keyboard, and a touch panel. The input unit 12 may be configured as an interface for connecting these input devices to the extension communication device 1. The input unit 12 receives input of various types of information to the extension communication device 1.

The communication unit 13 includes a communication interface for connecting the extension communication device 1 to an external device. The communication unit 13 communicates with an external device via wired or wireless.

The storage unit 14 is configured by using a computer-readable storage medium device such as a magnetic hard disk device or a semiconductor storage device. The storage unit 14 stores various types of information regarding the extension communication device 1. The storage unit 14 stores information input via the input unit 12 or the communication unit 13, for example.

The output unit 15 outputs various types of information. The output unit 15 includes a display device such as a cathode ray tube (CRT) display, a liquid crystal display, or an electro-luminescence (EL) display. The output unit 15 may be configured as an interface for connecting these display devices to the extension communication device 1. The output unit 15 outputs information input to the input unit 12, for example.

The conductive circuit 102 is a circuit connected to the antenna 101. The conductive circuit 102 propagates the uplink signal received by the antenna 101 to the second communication support device 4. The conductive circuit 102 propagates the downlink signal propagated from the second communication support device 4 to the antenna 101. The conductive circuit 102 and the antenna 101 may be provided outside the extension communication device 1.

Figure 5:
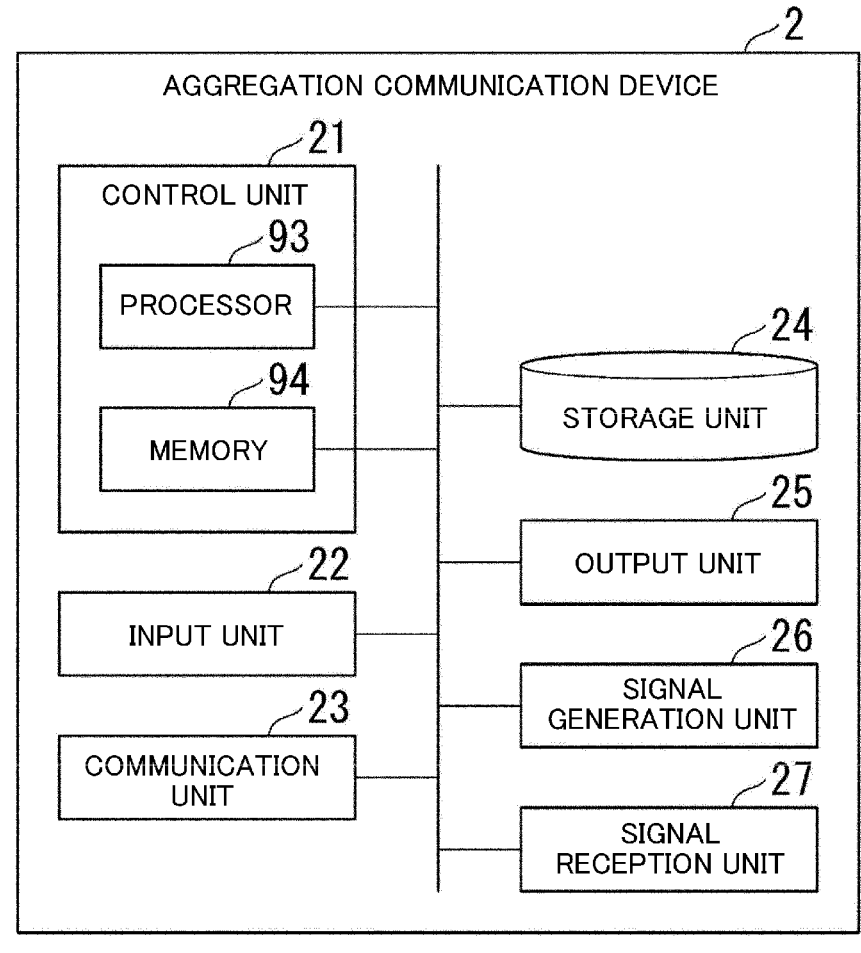
FIG. 5 is a diagram illustrating an example of a hardware configuration of an aggregation communication device according to the embodiment.

FIG. 5 is a diagram illustrating an example of a hardware configuration of the aggregation communication device 2 according to the embodiment. The aggregation communication device 2 includes a control unit 21 including a processor 93 such as a CPU and a memory 94 connected via a bus, and executes a program. The aggregation communication device 2 functions as a device including the control unit 21, the input unit 22, the communication unit 23, a storage unit 24, and an output unit 25 by executing a program.

More specifically, the processor 93 reads the program stored in the storage unit 24, and stores the read program in the memory 94. By the processor 93 executing the program stored in the memory 94, the aggregation communication device 2 functions as a device including the control unit 21, the input unit 22, the communication unit 23, the storage unit 24, the output unit 25, a signal generation unit 26, and a signal reception unit 27.

The control unit 21 controls operations of various functional units provided in the aggregation communication device 2. The control unit 21 executes, for example, downlink signal processing. That is, the control unit 21 controls the operation of the signal generation unit 26 to generate a downlink signal, for example. The control unit 21 executes, for example, uplink signal processing. The control unit 21 controls, for example, the operation of the output unit 25. The control unit 21 records various types of information in the storage unit 24, for example.

The input unit 22 includes input devices such as a mouse, a keyboard, and a touch panel. The input unit 22 may be configured as an interface for connecting these input devices to the aggregation communication device 2. The input unit 22 receives input of various types of information to the aggregation communication device 2. The information input to the input unit 22 is information carried by a signal generated by the aggregation communication device 2, for example.

The communication unit 23 includes a communication interface for connecting the aggregation communication device 2 to an external device. The communication unit 23 communicates with an external device via wired or wireless. The external device may be, for example, a device that instructs the aggregation communication device 2 on information carried by a signal generated by the aggregation communication device 2.

The storage unit 24 is configured by using a computer-readable storage medium device such as a magnetic hard disk device or a semiconductor storage device. The storage unit 24 stores various types of information regarding the aggregation communication device 2. The storage unit 24 stores information input via the input unit 22 or the communication unit 23, for example. The storage unit 24 stores, for example, various types of information generated by execution of uplink signal processing. The storage unit 24 stores, for example, various types of information generated by execution of downlink signal processing.

The output unit 25 outputs various types of information. The output unit 25 includes a display device such as a CRT display, a liquid crystal display, an organic EL display, or the like. The output unit 25 may be configured as an interface for connecting such a display device to the aggregation communication device 2. The output unit 25 outputs information input to the input unit 22, for example. The output unit 25 may display, for example, the result of executing uplink signal processing.

The signal generation unit 26 includes elements such as a power supply and a modulator, and generates a downlink electrical signal. The signal generation unit 26 is electrically connected to the second communication support device 4, and the downlink electrical signal generated by the signal generation unit 26 propagates to the second communication support device 4. The operation of the signal generation unit 26 is controlled by the control unit 21.

The signal reception unit 27 is electrically connected to the second communication support device 4, and receives an uplink electrical signal propagated from the second communication support device 4. The control unit 21 executes uplink signal processing on the signal received by the signal reception unit 27.

Figure 6:
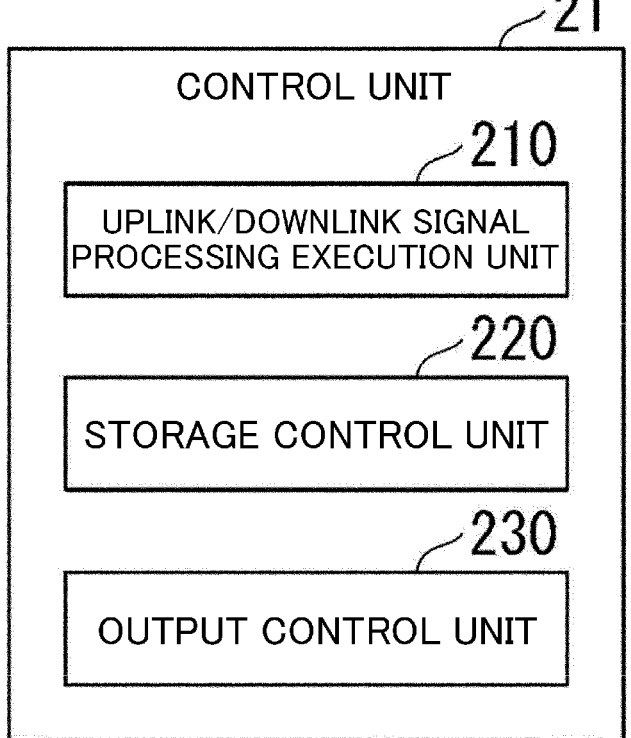
FIG. 6 is a diagram illustrating an example of a configuration of a control unit provided in the aggregation communication device according to the embodiment.

FIG. 6 is a diagram illustrating an example of a configuration of the control unit 21 provided in the aggregation communication device 2 according to the embodiment. The control unit 21 includes an uplink/downlink signal processing execution unit 210, a storage control unit 220, and an output control unit 230.

The uplink/downlink signal processing execution unit 210 executes uplink signal processing. More specifically, the uplink/downlink signal processing execution unit 210 executes uplink signal processing on the signal received by the signal reception unit 27. The uplink/downlink signal processing execution unit 210 executes downlink signal processing. Therefore, the uplink/downlink signal processing execution unit 210 controls the operation of the signal generation unit 26. The storage control unit 220 records various types of information in the storage unit 14. The output control unit 230 controls the operation of the output unit 25.

Figure 7:
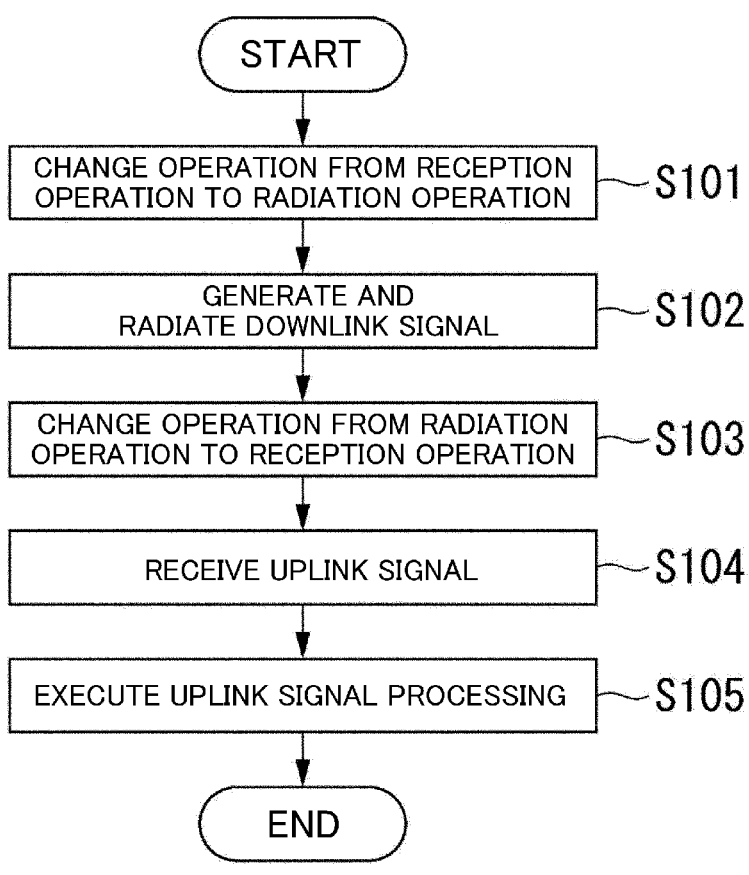
FIG. 7 is a flowchart illustrating an example of a flow of processing executed in a sub-communication system according to the embodiment.

FIG. 7 is a flowchart illustrating an example of the flow of processing executed in one sub-communication system 10 according to the embodiment. The switch control unit 405 changes the operation of the antenna 101 from the reception operation to the radiation operation (step S101). Next, the uplink/downlink signal processing execution unit 210 executes downlink signal processing (step S102). By executing the downlink signal processing, a downlink signal is generated and the downlink signal is radiated from the antenna 101. Next, the switch control unit 405 changes the operation of the antenna 101 from the radiation operation to the reception operation (step S103).

When the operation of the antenna 101 is changed to the reception operation, the uplink signal transmitted by the terminal 9 starts propagating from the antenna 101 to the aggregation communication device 2. Next, the signal reception unit 27 receives the uplink signal (step S104). Next, the uplink/downlink signal processing execution unit 210 executes uplink signal processing (step S105). Thereafter, the processing from step S101 to step S105 is repeated until a predetermined termination condition is satisfied. The predetermined termination condition is, for example, a condition that the power supply of the radio communication system 100 is turned off.

Hereinafter, with reference to FIGS. 8 and 9, the delay adjustment of the downlink signal and the delay adjustment of the uplink signal executed in one sub-communication system 10 will be described using the radio communication system 100 compatible with a 5G new radio (NR) environment as an example. In the radio communication system 100 compatible with the 5G NR environment is, for example, a radio communication system 100 in which the aggregation communication device 2 has functions of a centralized unit (CU), a distributed unit (DU), and a radio unit (RU) in 5G NR.

The CU, DU, and RU in 5G NR are the CU, DU, and RU described in NPL 1. FIGS. 8 and 9 illustrate the delay adjustment of the downlink signal and the delay adjustment of the uplink signal executed in one sub-communication system 10 by taking the case where the aggregation communication device 2 has functions of CU, DU, and RU in 5G NR as an example.

The expression "the aggregation communication device 2 has functions of CU, DU, and RU in 5G NR" means that the aggregation communication device 2 operates as CU, DU, and RU in 5G NR in communication. The expression "operating as an RU in the 5G NR" means executing the processing that an RU in 5G NR executes (hereinafter referred to as "RU processing").

The expression "operating as a CU in the 5G NR" means executing the processing that a CU in 5G NR executes (hereinafter referred to as "CU processing"). The expression "operating as a DU in the 5G NR" means executing the processing that a DU in 5G NR executes (hereinafter referred to as "DU processing").

Therefore, the expression "the aggregation communication device 2 has functions of CU, DU, and RU" means that the control unit 21 executes CU processing, DU processing, and RU processing. The expression "the control unit 21 executes CU processing, DU processing, and RU processing" means, for example, that the uplink/downlink signal processing execution unit 210 executes CU processing, DU processing, and RU processing. Execution of CU processing, DU processing, and RU processing includes execution of uplink signal processing and downlink signal processing.

Figure 8:
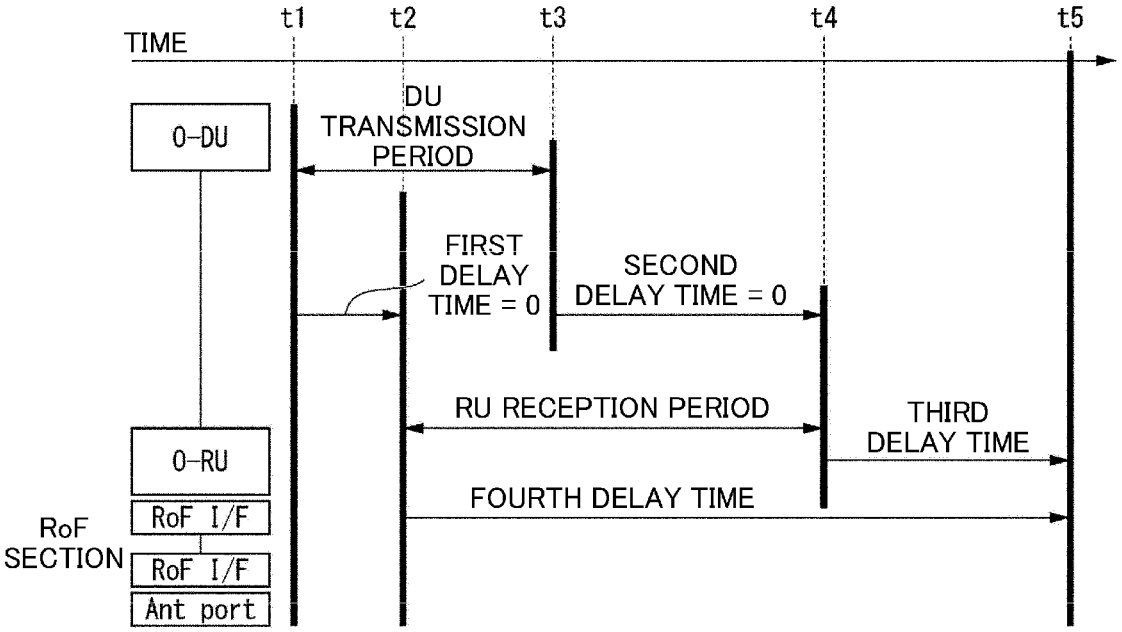
FIG. 8 is an explanatory diagram for describing downlink signal delay adjustment executed in the sub-communication system according to the embodiment.

FIG. 8 is an explanatory diagram for describing delay adjustment of a downlink signal executed in a set of one aggregation communication device 2 and one extension communication device 1 according to the embodiment. More specifically, FIG. 8 is an explanatory diagram for describing delay adjustment of a downlink signal executed in a set of one aggregation communication device 2 and one extension communication device 1 in the radio communication system 100 compatible with the 5G NR environment.

"O-DU" means a device that executes DU processing. "O-RU" means a device that executes RU processing. "ROF I/F" means an interface that performs analog RoF transmission. "RoF section" means a section in which analog RoF transmission is performed. A RoF section means a section in which a signal propagates through the analog transmission line 5. "Ant port" means an antenna output. The horizontal axis in FIG. 8 indicates the time axis. t5 is the timing at which the signal is radiated from the antenna 101.

FIG. 8 illustrates that a device executing DU processing has only to transmit a signal between times t1 and t3. Hereinafter, a period during which a device that executes DU processing transmits a signal is referred to as a DU transmission period. FIG. 8 illustrates that a device executing RU processing has only to receive a signal between time t2 and time t4. Hereinafter, a period during which a device that executes RU processing receives a signal is referred to as an RU reception period. Times t1 to t5 have a relationship of t1≤t2≤t3≤t4≤t5, and t1 is earlier than t5.

Thus, the DU transmission period and the RU reception period are determined by time t1, time t2, time t3, and time t4. Specific times of time t1, time t2, time t3, and time t4 are determined on the basis of a first delay time, a second delay time, a third delay time, and a fourth delay time.

The first delay time is a minimum value of delay occurring in an FH section determined in advance or determined by measurement. The second delay time is a maximum value of delay occurring in the FH section determined in advance or determined by measurement. The FH section is a section for connecting a device executing RU processing and a device executing DU processing, and a section in which a signal propagates. The FH section is, for example, a section of a transmission line connecting a device executing RU processing and a device executing DU processing.

For example, when a device executing RU processing and a device executing DU processing are the same as in the case where the control unit 21 executes the CU processing, the DU processing, and the RU processing, the delay occurring in the FH section may be a time difference between timing when the CU processing and the DU processing are executed and timing when the RU processing is executed. Therefore, for example, when a device executing RU processing and a device executing DU processing are the same as in the case where the control unit 21 executes the CU processing, the DU processing, and the RU processing, the FH section is a signal path along which a signal travels from a functional unit executing CU processing and DU processing to a functional unit executing RU processing.

The third delay time is a total time of the minimum value of the RU internal delay and the delay from the device executing RU processing to the Ant port. The delay from the device executing RU processing to the Ant port is the delay of the RoF section. The third delay time is determined in advance or obtained by measurement. The fourth delay time is a total time of the RU internal retention time, the maximum value of the RU internal delay, and the delay from the device executing RU processing to the Ant port. The fourth measurement time is determined in advance or obtained by measurement. The RU internal delay is a delay occurring within the device executing RU processing.

In the delay adjustment of a downlink signal executed in a set of one aggregation communication device 2 and one extension communication device 1 in the radio communication system 100 compatible with the 5G NR environment, when CU, DU, and RU are the same device as described above, both the first delay time and the second delay time are set to zero. In the delay adjustment of a downlink signal executed in a set of one aggregation communication device 2 and one extension communication device 1 in the radio communication system 100 compatible with the 5G NR environment, the third delay time is set to the sum of the minimum value of the RU internal delay and the measured value of the delay from the RU to the Ant port.

Thus, in the delay adjustment of a downlink signal executed in a set of one aggregation communication device 2 and one extension communication device 1 in the radio communication system 100 compatible with the 5G NR environment, the adjustment is also performed on the basis of the delay occurring in the RoF section.

The delay adjustment of the downlink signal is performed by the downlink delay adjustment unit 305. Further, in the example illustrated in FIG. 8, since the device executing RU processing is the aggregation communication device 2 as described above, the RoF section is a section in which a signal is transmitted and is a section between the aggregation communication device 2 and the antenna 101. Therefore, the time of the delay adjusted by the downlink delay adjustment unit 305 in the delay adjustment of the downlink signal is a time based on the total value of the delay time occurring in a section where the downlink signal propagates from the aggregation communication device 2 to the antenna

101 and the minimum value of the delay occurring within the aggregation communication device 2. Note that the time of the delay adjusted by the downlink delay adjustment unit 305 in the delay adjustment of the downlink signal need not necessarily be the time based on the minimum value of the delay occurring within the aggregation communication device 2.

Figure 9:
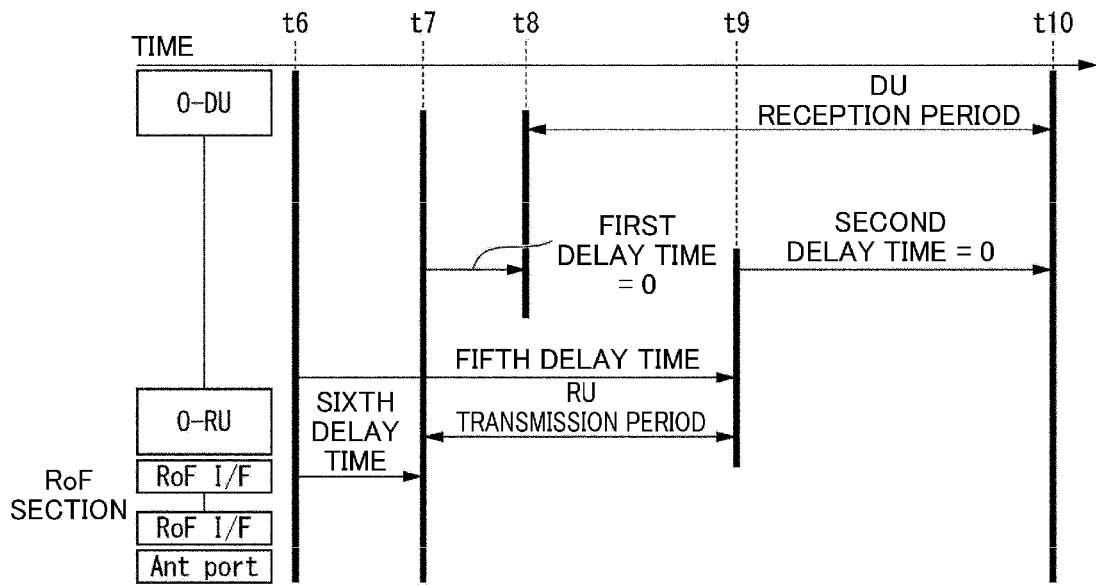
FIG. 9 is an explanatory diagram for describing uplink signal delay adjustment executed in the sub-communication system according to the embodiment.

FIG. 9 is an explanatory diagram for describing delay adjustment of an uplink signal executed in a set of one aggregation communication device 2 and one extension communication device 1 according to the embodiment. More specifically, FIG. 9 is an explanatory diagram for describing delay adjustment of an uplink signal executed in a set of one aggregation communication device 2 and one extension communication device 1 in the radio communication system 100 compatible with the 5G NR environment. The horizontal axis in FIG. 9 indicates the time axis. t6 is the timing at which the antenna 101 receives the signal.

FIG. 9 illustrates that a device executing DU processing has only to receive a signal between times t8 and t10. Hereinafter, a period during which a device that executes DU processing receives a signal is referred to as a DU reception period. FIG. 9 illustrates that a device executing RU processing has only to transmit a signal between time t7 and time t9. Hereinafter, a period during which a device that executes RU processing transmits a signal is referred to as an RU transmission period. Times t6 to t10 have a relationship of t6≤t7≤t8≤t9≤t10, and t6 is earlier than t10.

Thus, the DU reception period and the RU transmission period are determined by time t7, time t8, time t9, and time t10. Specific times of time t7, time t8, time t9, and time t10 are determined on the basis of a first delay time, a second delay time, a fifth delay time, and a sixth delay time.

The fifth delay time is a total time of the maximum value of the RU internal delay and the maximum value of the delay from the device executing RU processing to the Ant port. The fifth delay time is determined in advance or obtained by measurement. The sixth delay time is a total time of the minimum value of the RU internal delay and the delay from the device executing RU processing to the Ant port. The sixth delay time is determined in advance or obtained by measurement.

In the delay adjustment of an uplink signal executed in a set of one aggregation communication device 2 and one extension communication device 1 in the radio communication system 100 compatible with the 5G NR environment, when CU, DU, and RU are the same device as described above, both the first delay time and the second delay time are set to zero. In the delay adjustment of an uplink signal executed in a set of one aggregation communication device 2 and one extension communication device 1 in the radio communication system 100 compatible with the 5G NR environment, the sixth delay time is set to the sum of the minimum value of the RU internal delay and the measured value of the delay from the device executing RU processing to the Ant port.

Thus, in the delay adjustment of an uplink signal executed in a set of one aggregation communication device 2 and one extension communication device 1 in the radio communication system 100 compatible with the 5G NR environment, the adjustment is also performed on the basis of the delay occurring in the RoF section.

The delay adjustment of the uplink signal is performed by the uplink delay adjustment unit 304. Further, in the example illustrated in FIG. 9, since the device executing RU processing is the aggregation communication device 2 as described above, the RoF section is a section in which a signal is transmitted and is a section between the aggregation communication device 2 and the antenna 101. Therefore, the time of the delay adjusted by the uplink delay adjustment unit 304 in the delay adjustment of the uplink signal is a time based on the total value of the delay time occurring in a section where the uplink signal propagates from the antenna 101 to the aggregation communication device 2 and the minimum value of the delay occurring within the aggregation communication device 2. Note that the time of the delay adjusted by the uplink delay adjustment unit 304 in the delay adjustment of the uplink signal need not necessarily be the time based on the minimum value of the delay occurring within the aggregation communication device 2.

The radio communication system 100 configured in this way can appropriately transmit and receive an uplink signal and a downlink signal through respective paths. Also, the transmission/reception timing of the uplink signal and the downlink signal can be appropriately adjusted in the aggregation communication device 2 so that the timing of transmission/reception switching of TDD is matched in the antenna 101.

Therefore, in the radio communication system 100, deterioration in communication quality such as crosstalk between an uplink signal and a downlink signal and deterioration in communication efficiency can be suppressed.

Modification Example

The analog transmission line 5 may be any path as long as it is a transmission line for propagating an uplink signal and a downlink signal and a degree of mutual interference between the uplink signal and the downlink signal is smaller than a predetermined reference due to a difference in frequency or a difference in space. The analog transmission line 5 is, for example, an optical fiber having an end connected to WDM as illustrated in FIG. 1. The analog transmission line 5 may be, for example, a path for performing subcarrier multiplexing (SCM) transmission, or a path in which a transmission line for transmitting an uplink signal and a transmission line for transmitting a downlink signal are present at spatially different positions.

The signals to be subjected to the delay adjustment by the uplink delay adjustment unit 304 and the downlink delay adjustment unit 305 are not necessarily analog signals, and may be digital signals as described above. Here, an example of the configuration of the first communication support device 3 in the case where the objects of the delay adjustment of the uplink delay adjustment unit 304 and the downlink delay adjustment unit 305 are digital signals will be described with reference to FIGS. 11 and 12. For the sake of simplicity of description, the same reference numerals as those in FIGS. 1 to 3 are assigned to those having the same functions as the functional units illustrated in FIGS. 1 to 3, and the description thereof will be omitted.

Figure 11:
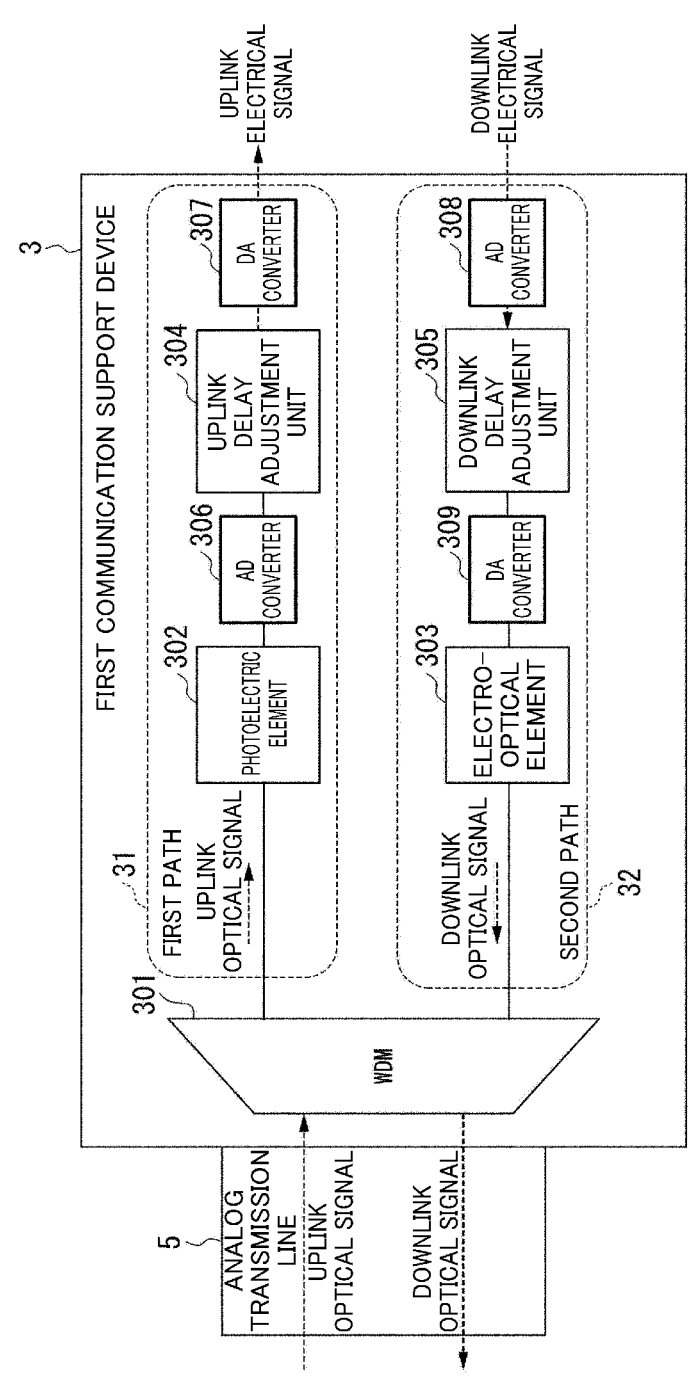
FIG. 11 is a first diagram illustrating an example of a configuration of a first communication support device 3 according to a modification example.

FIG. 11 is a first diagram illustrating an example of a configuration of the first communication support device 3 according to the modification example. FIG. 11 illustrates that the signal passing through an AD converter 306 is input to the uplink delay adjustment unit 304, and the output of the uplink delay adjustment unit 304 is input to a DA converter 307. A signal output from the photoelectric element 302 is input to the AD converter 306. The AD converter 306 is an analog-to-digital converter that converts an input analog signal into a digital signal and outputs the digital signal. The DA converter 307 is a digital-to-analog converter that converts an input digital signal into an analog signal and outputs the analog signal.

FIG. 11 illustrates that the signal passing through an AD converter 308 is input to the downlink delay adjustment unit 305, and the output of the downlink delay adjustment unit 305 is input to a DA converter 309. A signal output from the DA converter 309 is input to the electro-optical element 303. The AD converter 308 is an analog-to-digital converter that converts an input analog signal into a digital signal and outputs the digital signal. The DA converter 309 is a digital-to-analog converter that converts an input digital signal into an analog signal and outputs the analog signal.

Figure 12:
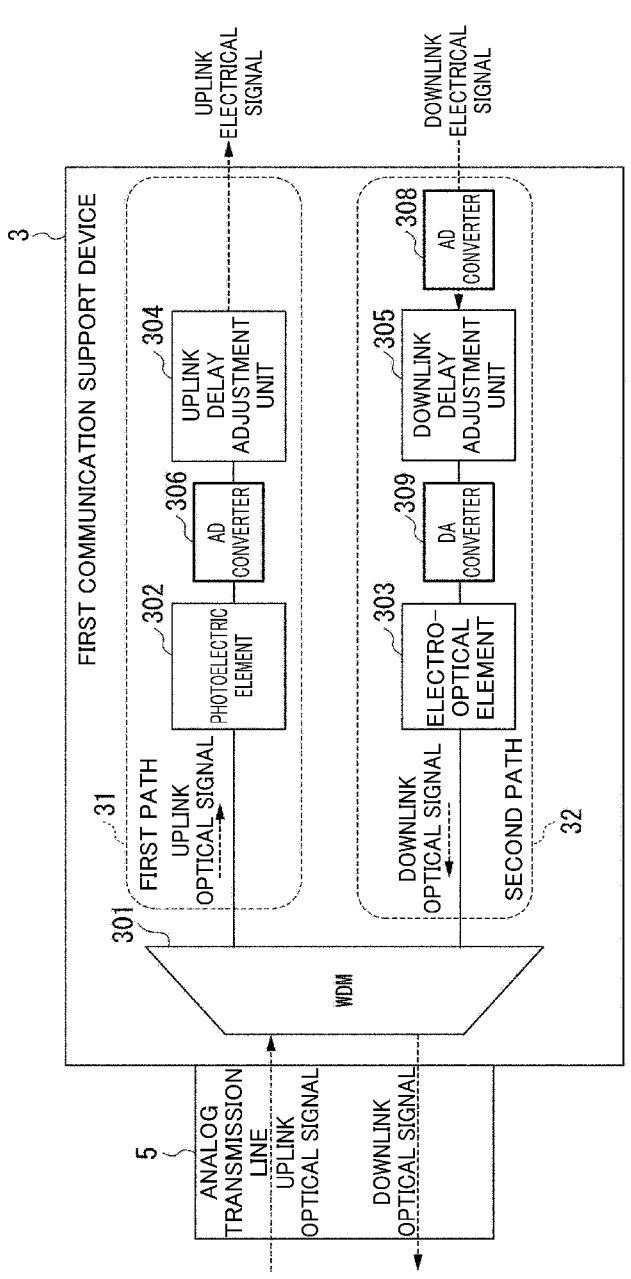
FIG. 12 is a second diagram illustrating an example of a configuration of the first communication support device 3 according to a modification example.

FIG. 12 is a second diagram illustrating an example of the configuration of the first communication support device 3 according to the modification example. For the sake of simplicity of description, the same components as those in FIG. 11 are denoted by the same reference numerals as those in FIG. 11, and the description thereof will be omitted. FIG. 12 illustrates that a signal passing through the AD converter 306 is input to the uplink delay adjustment unit 304. A signal output from the photoelectric element 302 is input to the AD converter 306. The AD converter 306 is an analog-to-digital converter that converts an input analog signal into a digital signal and outputs the digital signal. In the example illustrated in FIG. 12, unlike the example illustrated in FIG. 11, the output of the uplink delay adjustment unit 304 is propagated as a digital signal to the subsequent device (for example, the aggregation communication device 2) without being converted by the digital-to-analog converter.

Since the object of the delay adjustment is a digital signal, the uplink delay adjustment unit 304 and the downlink delay adjustment unit 305 configured as illustrated in FIGS. 11 and 12 can adjust the delay by the buffering described above.

In FIGS. 11 and 12, description has been made on the case where both the uplink delay adjustment unit 304 and the downlink delay adjustment unit 305 handle digital signals as the objects of delay adjustment. However, only one of the object of the delay adjustment by the uplink delay adjustment unit 304 and the object of the delay adjustment by the downlink delay adjustment unit 305 may be a digital signal, and the other may be an analog signal.

Note that the uplink delay adjustment unit 304 and the downlink delay adjustment unit 305 need not necessarily be provided in the first communication support device 3, and may be provided in the aggregation communication device 2. Note that the uplink delay adjustment unit 304 and the downlink delay adjustment unit 305 need not necessarily be provided in the first communication support device 3, and may be provided in the second communication support device 4.

Figure 10:
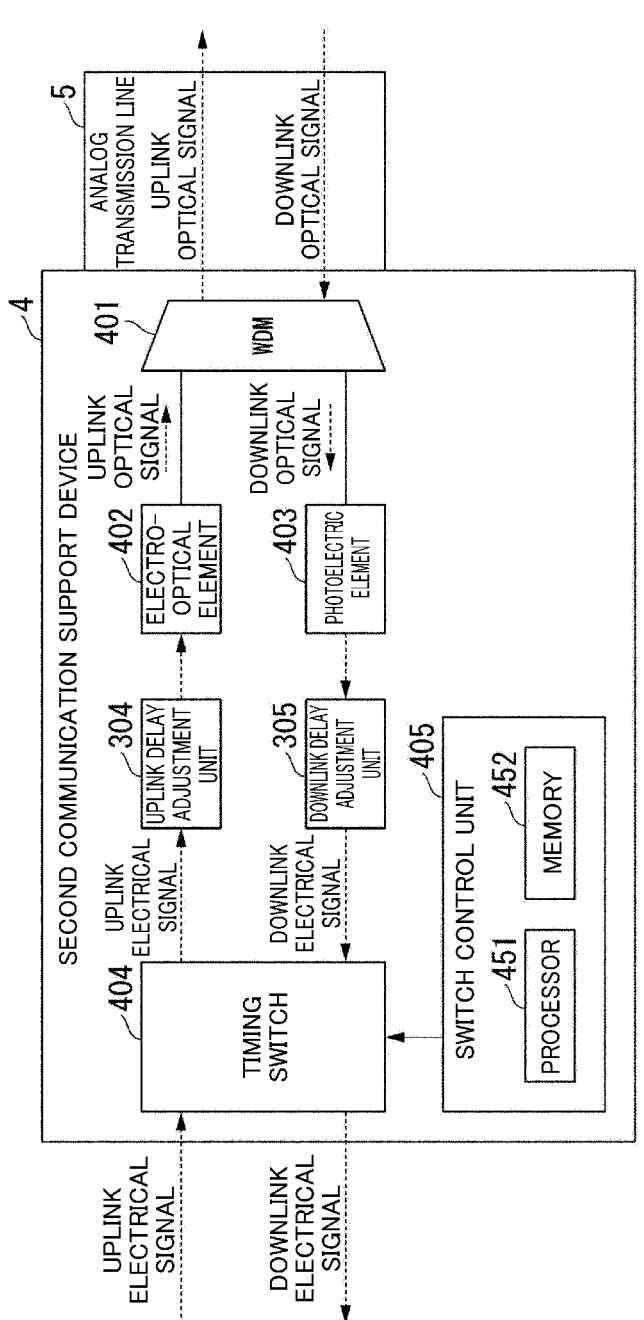
FIG. 10 is an explanatory diagram for describing an example of a connection state of an uplink delay adjustment unit and a downlink delay adjustment unit according to a modification example.

FIG. 10 is an explanatory diagram for describing an example of a connection state of the uplink delay adjustment unit 304 and the downlink delay adjustment unit 305 according to the modification example. When the second communication support device 4 includes the uplink delay adjustment unit 304 and the downlink delay adjustment unit 305, one side of the uplink delay adjustment units 304 is connected to the timing switch 404 and the other side thereof is connected to the electro-optical element 402. When the second communication support device 4 includes the uplink delay adjustment unit 304 and the downlink delay adjustment unit 305, one side of the downlink delay adjustment unit 305 is connected to the timing switch 404 and the other side thereof is connected to the photoelectric element 403.

Note that the uplink delay adjustment unit 304 and the downlink delay adjustment unit 305 are not limited to the example illustrated in FIG. 10, but may be located anywhere on a path connecting the timing switch 404 and the extension communication device 1.

Note that the extension communication device 1 may have a function of a radio unit (RU) in 5G new radio (NR), and the aggregation communication device 2 may have a function of a CU and a function of a DU. More specifically, the control unit 21 of the aggregation communication device 2 may execute CU processing and DU processing, and the control unit 11 of the extension communication device 1 may execute RU processing.

Each of the extension communication device 1, the aggregation communication device 2, the first communication support device 3, and the second communication support device 4 may be implemented using a plurality of information processing devices communicatively connected via a network. In this case, each functional unit provided in each of the extension communication device 1, the aggregation communication device 2, the first communication support device 3, and the second communication support device 4 may be distributed and implemented in a plurality of information processing devices.

Note that the extension communication device 1 and the second communication support device 4 need not necessarily be implemented as different devices. The extension communication device 1 and the second communication support device 4 may be implemented as one device having both functions. One device having the functions of the extension communication device 1 and the second communication support device 4 may be implemented as, for example, an extension station.

Note that the aggregation communication device 2 and the first communication support device 3 need not necessarily be implemented as different devices. The aggregation communication device 2 and the first communication support device 3 may be implemented as one device having both functions, for example. One device having the functions of the aggregation communication device 2 and the first communication support device 3 may be implemented as, for example, an aggregation station.

Note that one aggregation communication device 2 may be connected to a plurality of extension communication devices 1. In such a case, the delay adjustment is performed for each of the extension communication devices 1.

The uplink delay adjustment unit 304 and the downlink delay adjustment unit 305 may be a device that includes an analog-to-digital converter (ADC) and a digital-to-analog converter (DAC), and generates delay by buffering a digital signal.

Although 5G is used as an example of communication in the description, the communication standard of 5G is merely an example of the standard of communication of the radio communication system 100. The standard of communication of the radio communication system 100 may be another communication standard such as 6G as long as it is a communication standard that can use TDD.

Note that all or some of the respective functions of the radio communication system 100, the sub-communication system 10, the extension communication device 1, the aggregation communication device 2, the first communication support device 3, and the second communication support device 4 may be realized using hardware such as an application specific integrated circuit (ASIC), a programmable logic device (PLD), or a field programmable gate array (FPGA). The program may be recorded on a computer-readable recording medium. The computer-readable recording medium is, for example, a portable medium such as a flexible disk, a magneto-optical disk, a ROM, or a CD-ROM, or a storage device such as a hard disk built in a computer system. The program may be transmitted over telecommunications lines.

Note that the extension communication device 1 is an example of the terminal-side communication device. A device in which the extension communication device 1 and the second communication support device 4 are implemented as one device is also an example of the terminal-side communication device. The extension station is an example of the terminal-side communication device.

The first communication support device 3 is an example of a radio communication device that performs communication with the terminal-side communication device using an analog signal for transmitting information by a waveform of an amplitude or a phase of light to receive a signal received by the antenna 101 and transmit a signal radiated by the antenna 101. Hereinafter, a radio communication device that performs communication with the terminal-side communication device using an analog signal for transmitting information by a waveform of an amplitude or a phase of light to receive a signal received by the antenna 101 and transmit a signal radiated by the antenna 101 is referred as an aggregation side communication device. A device in which the aggregation communication device 2 and the first communication support device 3 are implemented as one device is also an example of the aggregation side communication device. Note that the own device is an example of the aggregation side communication device.

The second communication support device or the extension communication device 1 may be provided with a frequency converter and an if over fiber (IFoF) may be employed instead of the analog RoF.

The processing of step S101 is an example of a first switching step. The processing of step S103 is an example of a second switching step.

Although the embodiments of the present invention have been described in detail with reference to the drawings, specific configurations are not limited to these embodiments, and designs and the like within a range that does not deviating from the gist of the present invention are also included.

REFERENCE SIGNS LIST

100 Radio communication system
10 Sub-communication system
1 Extension communication device
2 Aggregation communication device
3 First communication support device
4 Second communication support device
5 Analog transmission line
101 Antenna
31 First path
32 Second path
301 Wavelength division multiplexing (WDM)
302 Photoelectric element
303 Electro-optical element
304 Uplink delay adjustment unit
305 Downlink delay adjustment unit
306 AD converter
307 DA converter
308 AD converter
309 DA converter
401 Wavelength division multiplexing (WDM)
402 Electro-optical element
403 Photoelectric element 404 Timing switch
405 Switch control unit
451 Processor
452 Memory
11 Control unit
12 Input unit
13 Communication unit
14 Storage unit
15 Output unit
102 Conductive circuit
21 Control unit
22 Input unit
23 Communication unit
24 Storage unit
25 Output unit
26 Signal generation unit
27 Signal reception unit
210 Uplink/downlink signal processing execution unit
220 Storage control unit
230 Output control unit
9 Terminal
91 Processor
92 Memory
93 Processor
94 Memory

The invention claimed is:

1. A radio communication device that performs communication with a terminal-side communication device having an antenna using an analog signal for transmitting information by a waveform of an amplitude or a phase of light to receive a signal received by the antenna and transmit a signal radiated by the antenna, the terminal-side communication device and the radio communication device being included in a radio communication system that performs radio communication with a communication target terminal via the antenna using time division duplex (TDD), the radio communication device comprising:

an uplink delay adjuster is located in a first path and is configured to adjust a delay caused by propagation of an uplink signal that is a signal flowing from the terminal to the radio communication device via the antenna, where the uplink signal propagates along the first path using wavelength division multiplexing; and a downlink delay adjuster is located in a second path and is configured to adjust a delay caused by propagation of a downlink signal that is a signal flowing from the radio communication device to the terminal via the antenna, where the downlink signal propagates along the second path using wavelength division multiplexing, such that the first path and the second path are distinct from each other and do not overlap.

2. The radio communication device according to claim 1, wherein a time of the delay adjusted by the uplink delay adjuster is a time based on a delay time occurring in a section in which the uplink signal propagates from the antenna to the radio communication device.

3. The radio communication device according to claim 1, wherein a time of the delay adjusted by the downlink delay adjuster is a time based on a delay time occurring in a section in which the downlink signal propagates from the radio communication device to the antenna.

4. The radio communication device according to claim 1, wherein the uplink signal whose delay is to be adjusted by the uplink delay adjuster is converted from analog to digital prior to the uplink delay adjuster.

5. The radio communication device according to claim 1, wherein the downlink signal whose delay is to be adjusted by the downlink delay adjuster is converted from analog to digital prior to the downlink delay adjuster a digital signal.

6. A radio communication system that performs communication with a communication target terminal using time division duplex (TDD), the radio communication system comprising:

a terminal-side communication device having an antenna; and a radio communication device that performs communication with the terminal-side communication device using an analog signal for transmitting information by a waveform of an amplitude or a phase of light to receive a signal received by the antenna and transmit a signal radiated by the antenna, wherein the radio communication device includes an uplink delay adjuster is located in a first path and is configured to adjust a delay caused by propagation of an uplink signal that is a signal flowing from the terminal to the radio communication device via the antenna, where the uplink signal propagates along the first path using wavelength division multiplexing, and a downlink delay adjuster is located in a second path and is configured to adjust a delay caused by propagation of a downlink signal that is a signal flowing from the radio communication device to the terminal via the antenna, where the downlink signal propagates along the second path using wavelength division multiplexing, such that the first path and the second path are distinct from each other and do not overlap.

7. A radio communication method provided by a radio communication system including a terminal-side communication device having an antenna and a radio communication device that performs communication with the terminal-side communication device using an analog signal for transmitting information by a waveform of an amplitude or a phase of light to receive a signal received by the antenna and transmit a signal radiated by the antenna, the radio communication device including an uplink delay adjuster is located in a first path and is configured to adjust a delay caused by propagation of an uplink signal that is a signal flowing from the terminal to the radio communication device via the antenna, where the uplink signal propagates along the first path using wavelength division multiplexing, and a downlink delay adjuster is located in a second path and is configured to adjust a delay caused by propagation of a downlink signal that is a signal flowing from the radio communication device to the terminal via the antenna, where the downlink signal propagates along the second path using wavelength division multiplexing, such that the first path and the second path are distinct from each other and do not overlap, the radio communication method comprising:

switching an operation of the antenna from a reception operation of receiving a signal transmitted by the terminal to a radiation operation of radiating a signal; and switching the operation of the antenna from the radiation operation to the reception operation.

* * * * *